(12) United States Patent
Derian

(10) Patent No.: US 6,567,225 B1
(45) Date of Patent: May 20, 2003

(54) SPECTRUM FILTER WHEEL

(76) Inventor: Artine B. Derian, 536 W. Avenida De Las Flores, Thousand Oaks, CA (US) 91360

( * ) Notice: Subject to any disclaimer, the term of this patent is extended or adjusted under 35 U.S.C. 154(b) by 0 days.

(21) Appl. No.: 09/954,558

(22) Filed: Sep. 17, 2001

(51) Int. Cl.[7] .............................. G02B 5/22; G02B 7/00
(52) U.S. Cl. ....................... 359/892; 359/889; 359/885; 362/293
(58) Field of Search .................................. 359/892, 885, 359/611, 889; 362/293

(56) References Cited

U.S. PATENT DOCUMENTS 5,371,543 A * 12/1994 Anderson .................... 348/270

FOREIGN PATENT DOCUMENTS

GB 802427 * 10/1958

OTHER PUBLICATIONS

2000 The Backyard Astronomers Guide by Terrence Dickinson & Alan Dyer p78.
2001 True Technology Customer Wheel Online Home Page http://www.truetech.dircon.co.uk/True%20Technology/custom%20-wheel/thewheel.html.

* cited by examiner

Primary Examiner—John Juba, Jr.
Assistant Examiner—Leo Boutsikaris

(57) ABSTRACT

A variable photo-visual telescope filter that consists of filter disc (24 and FIG. 5), mounted in a protective housing (FIG. 4). The photo-visual filter is sandwiched between a telescope eyepiece at one end (Prior Art 10) and a telescope eyepiece holder (Prior Art 14) at the back of a telescope. The filter disc consists of a hard, clear material, imbedded with colors. The colors are concentrically arranged on the filter disc (24). The filter housing has an indicator window (22), which shows an abbreviation of the color being filtered (30). Filter colors are varied be slowly turning a rotary knob (18) which is attached to the filter disc (24). The rotary knob turns the enclosed filter, independent of the filter housing.

10 Claims, 4 Drawing Sheets

SPECTRUM FILTER WHEEL

CROSS-REFERENCE TO RELATED APPLICATION

Not applicable.

BACKGROUND

1. Field of Invention

This invention relates to photo-visual telescope filters, specifically to an improved way of filtering images of planets, the moon and daytime views.

BACKGROUND

2. Description of Prior Art

Telescope users commonly enhance images by using transparent colored photo-visual filters. Such filters reduce glare and increase the contrast and resolution of both lunar and planetary views. Daytime filter use in spotting scopes can eliminate color flinging around bright objects and improve the contrast of images. These filters are used in visual, photographic and CCD (charge coupling device) imaging applications.

The most common photo-visual filter consists of a flat, circular, dyed glass element which is mounted in a metal cell 12, as shown in prior art FIG. 1. The filter is threaded to the bottom of a telescope eyepiece 10, also shown in prior art FIG. 1. The filtered eyepiece is then inserted into the telescope eyepiece holder, shown as 14 in FIG. 1, at the back of a telescope. Filter cells are printed with numbers, indicating the color. For example, please refer to the Wratten numbers on page 78 of The Backyard Astronomer's Guide by Terence Dickinson and Alan Dyer, printed in 2000. They can be combined to mix colors of filtration.

Telescope users find the design of filtration just described as flawed:

(a) Users are required to keep a large selection of individual colored filters in many colors of the visual spectrum, making telescopic astronomy costly and complicated.

(b) Changing filters during a viewing session increases the chances of damage to filters and eyepieces. Filters and eyepieces can drop, break, smudge or scratch while being handled in dark or low light conditions. Damage to filters and telescope eyepieces can occur because these filters must be manually threaded onto or off of eyepieces many times during a viewing session, sometimes with gloved hands in the winter season.

(c) Exposing filters to open air conditions can make them dirty or dusty, negatively effecting an image and requiring frequent cleaning.

(d) The letters or numbers that indicate the colors of individual filter cells are difficult to read due to their small size, which is approximately 3 mm in height.

(e) Determining individual colors is difficult, requiring the user to memorize or refer to a confusing numbering system, as shown in the Planetary Filter Chart on page 78 of The Backyard Astronomer's Guide by Terence Dickinson and Alan Dyer, printed in 2000.

(f) Cross-threading damage to an eyepiece or filter can occur during changes. The chances of damage are increased when two or more filters must be combined to get a blended color.

The True Technology Ltd. Custom Wheel is an example of a complex photo-visual filter holder. It can be seen online at http://www.truetech.dircon.co.uk/True%20Technology/custom%20wheel/thewheel.html. A simplified illustration of this system is shown in prior art FIG. 2 and prior art FIG. 3. The filter holder (prior art FIG. 3) must revolve to change the individual filter color. Filters can be rotated by manual turning or by hand controller with the addition of a computer program. Problems of these systems include the need for expensive filter holders and housings. In addition, several individual colored filters must be obtained. Motors, hand controllers, computers, and software are also needed. Weight can also be a factor, which might make a telescope's delicate balance system need rebalancing.

SUMMARY

In accordance with the present invention a photo-visual filter comprises a variable, colored filter disc, mounted in a lightweight enclosure.

OBJECTS AND ADVANTAGES

Accordingly, besides the objects and advantages of photo-visual filters in telescope usage described above, several objects and advantages of the present invention are:

(a) to provide a variable photo-visual filter that will replace many individual photo-visual filters;

(b) to provide a photo-visual filter which can be varied by rotation of a knob;

(c) to provide a variable photo-visual filter which provides easy identification of the color in use;

(d) to provide a variable photo-visual filter which is protected from handling;

(e) to provide a variable photo-visual filter which is lightweight;

(f) To provide a variable photo-visual filter which is inexpensive to manufacture, passing on savings to the consumer; and (g) To provide a variable photo-visual filter which is easy to use, without the need for motors, computers or complex designs.

Further objects and advantages are to provide a photo-visual filter design that can be varied slightly in size or dimension, compatible with many different telescopes, spotting scopes and microscopes. Still further objects and advantages will become apparent from a consideration of the ensuing description and drawings.

DRAWING FIGURES

Prior Art FIG. 1 shows a side view of a telescope eyepiece, photo-visual filter cell and eyepiece holder, located at the back of a telescope.

Prior Art FIG. 2 shows a side view of a filter housing.

Prior Art FIG. 3 shows a plan view of a rotary filter holder.

REFERENCE NUMERALS IN DRAWINGS

| | |
|---|---|
| 10 telescope eyepiece | 12 prior art filter cell |
| 14 telescope eyepiece holder | 16 top housing eyepiece holder |
| 18 rotary knob | 20 top housing |

-continued

| | |
|---|---|
| 22 indicator window | 24 filter disc |
| 26 bottom housing | 28 bottom housing barrel |
| 30 color indicator | 32 yellow filter section |
| 34 yellow-green filter section | 36 green filter section |
| 38 blue-green filter section | 40 blue filter section |
| 42 blue-violet filter section | 44 violet filter section |
| 46 red-violet filter section | 48 red filter section |
| 50 red-orange filter section | 52 orange filter section |
| 54 yellow-orange filter section | |

DESCRIPTION—FIGS. 4 AND 5-PREFERRED EMBODIMENT

Figure 4:
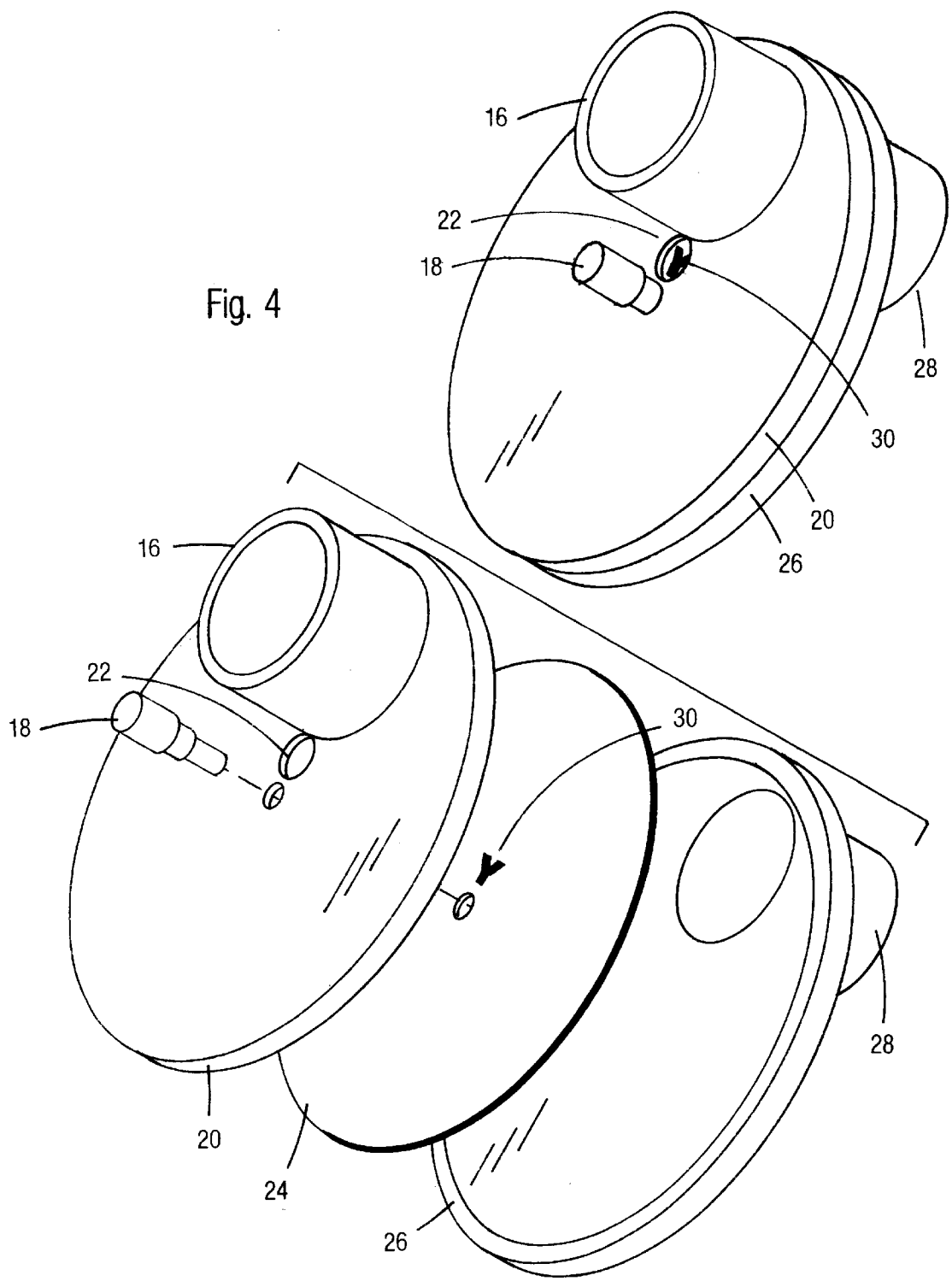
FIG. 4 shows both isometric and exploded views of a filter housing and filter.
Figure 5:
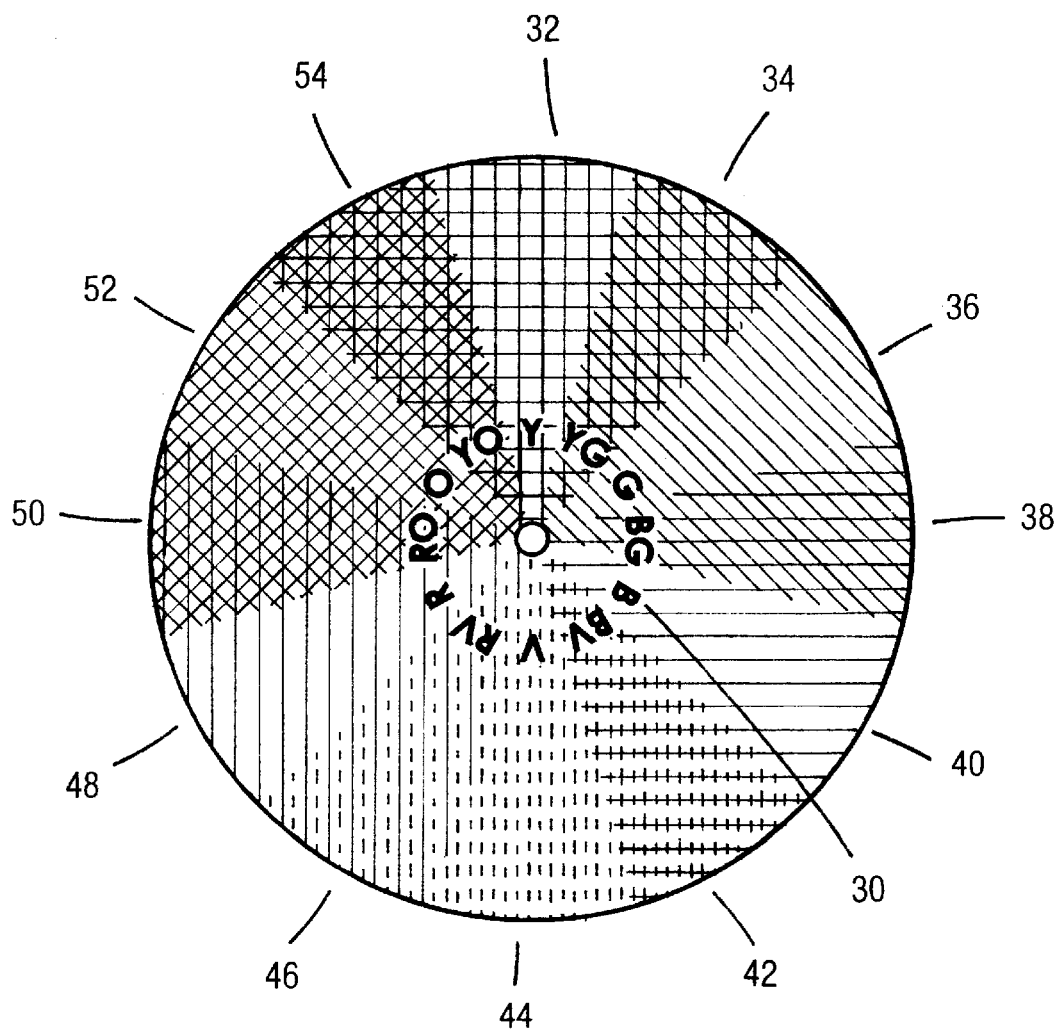
FIG. 5 shows a plan view of a filter disc imbedded with 12 colors, represented by standard hatch patterns, along with an example of corresponding color indicating symbols.

A preferred embodiment of the present invention is illustrated in FIG. 4 (exploded and isometric views) and FIG. 5 (plan view of filter disc). The filter is sandwiched in between a top housing 20 and a bottom housing 26. The top housing includes a top housing eyepiece holder 16. The top housing eyepiece holder consists of a hollow, cylindrical tube in which to drop in a telescope eyepiece 10 shown in plan view in prior ant FIG. 1. The top housing has a hole directly under the top housing eyepiece holder. This hole is approximately the diameter of the eyepiece holder, allowing a filtered light beam to pass through. A rotary knob 18 has a shaft which fits through a hole in the top housing and is attached to the center of the filter disc 24 inside, allowing the filter disc to be slowly rotated, independent of the filter housing. Both top and bottom housings are made of a rigid plastic material such as injection molded or vacuum-formed styrene plastic sheeting. They can each be transparent, opaque or a combination of both. Alternately, the top and bottom housings could be fabricated from metal sheeting such as aluminum or steel. The top housing 20 includes an indicator window 22 which shows a clear view of the color indicator 30, printed on the filter disc 24 below. The top housing and bottom housing are attached together with screws, bolts or any other type of similar hardware.

The filter disc 24 consists of a transparent rigid plastic, such as Acrylite FF, made by CYRO Industries. The thickness of the filter disc is between 1 mm to 5 mm. The filter disc might alternately be made from optically clear glass. The filter disc is imbedded with 12 concentric colors: yellow 32, yellow-green 34, green 36, blue-green 38, blue 40, blue-violet 42, violet 44, red-violet 46, red 48, red-orange 50, orange 52, and yellow-orange 54. The borders between filter colors can be blended to make a smooth transition of filtered views. The number of colors on a filter disc can be varied from between 2 to 100. Filter colors can be varied to include different tints, shades, tones or intensities of color.

The preferred embodiment of imbedding colors to the filter disc 24 is achieved by laminating a pre-printed acetate film, less than 1 mm thick, to the clear plastic or glass filter material. A filter disc design can easily be achieved with a desktop computer, loaded with a basic graphics program such as PhotoImpact Version 4.2, from Ulead Systems. A gradient design is applied to a circle shape. Text is added over the design to provide color indicators. Next, the design is printed out on clear acetate plastic such as Inkjet Printer Transparency Film from Apollo, made by ACCO Brands, Inc. The acetate and filter materials are laminated together with an optically clear adhesive, such as Facemount UV, made by Drytac. An alternate way of imbedding the filter with color is to paint on a transparent colored spectrum with paint or ink. In alternate embodiments, colors could be applied to the glass blank through electroplating, utilizing a vacuum chamber.

Figure 1:
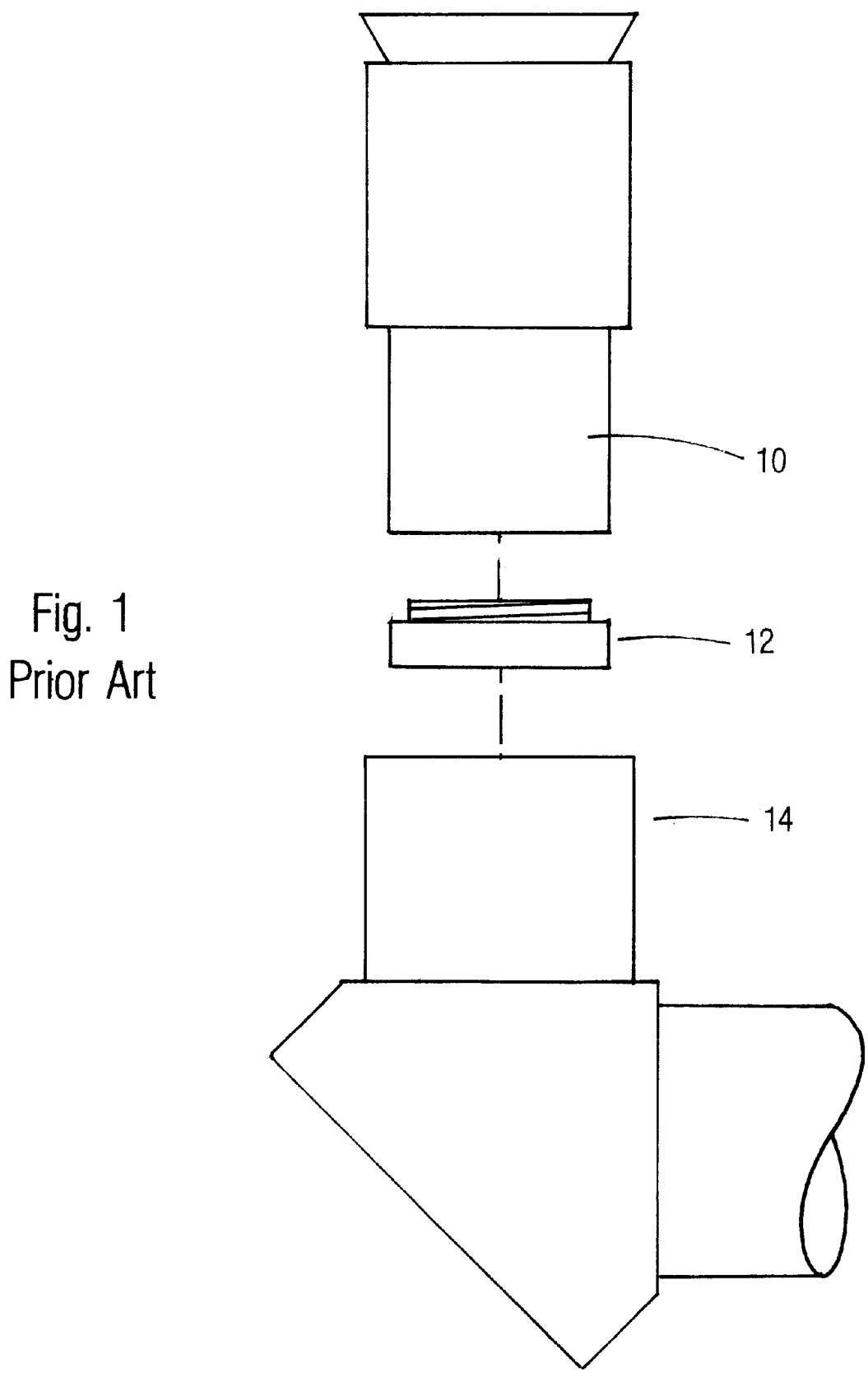
Figure 2:
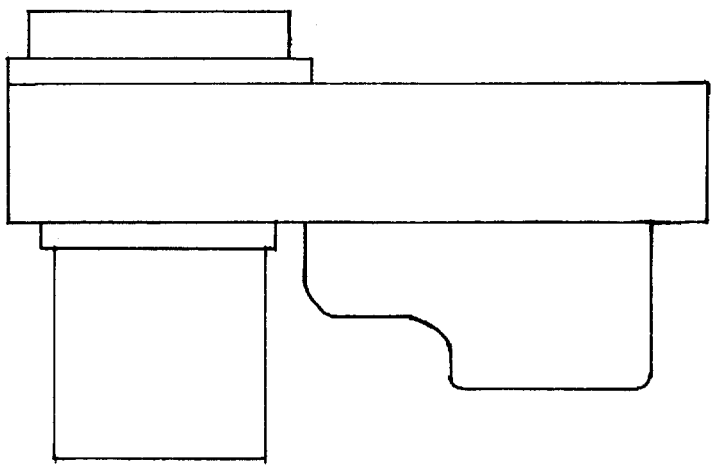
Figure 3:
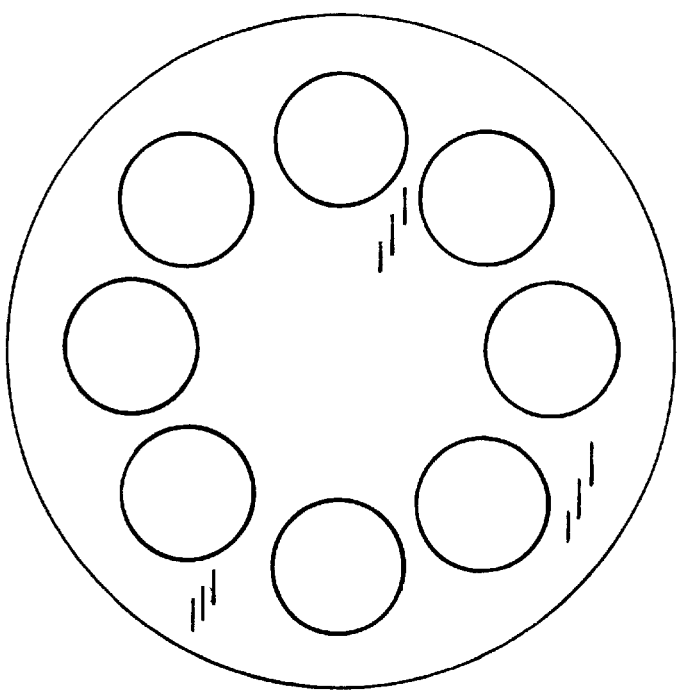

The bottom housing barrel 28 consists of a hollow rigid tube, which allows the present invention to be inserted into a telescope eyepiece holder 14, shown in prior art FIG. 1. The bottom filter housing has a hole, approximately the diameter of the bottom filter barrel. The hole allows a light beam to pass from the back of a telescope to the bottom filter housing. The light beam is then filtered through the filter disc 24. The filtered light beam then passes up through the top housing 20, the top housing eyepiece holder 16, telescope eyepiece 10 and finally into the eye of a telescope user.

OPERATION—FIGS 1, 3,4

The present invention is used by first securing the bottom housing barrel 28 into a telescope eyepiece holder 14. A telescope eyepiece 10 is then secured into the top housing eyepiece holder 16. A user then looks at a telescopic image through the telescope eyepiece 10. To vary the colors being filtered, a user simply turns the rotary knob 18. Different colors 32–54 are imbedded onto the filter disc 24. Color indicators 30 are placed over their respective colors. Looking through the indicator window 22 indicates the color being filtered.

CONCLUSIONS, RAMIFICATIONS, AND SCOPE

Accordingly, the reader will see that this invention provides a preferable alternative to obtaining a large collection of photo-visual filter cells. Additionally, complicated filter housings, computer programs, motors, or other expensive equipment can be eliminated.

Colors of filtration are arranged concentrically on the filter disc. They are also labeled in a simple, abbreviated form. Both of these features make filtered colors large enough to identify during use, even under low light conditions.

Manufacturing filter discs is a simple process. Many variable filter designs, complete with color indicators, can be printed out quickly on acetate film using desktop ink printers. Clear acrylic sheets provide a filter surface which is inexpensive to produce.

Although the descriptions above contain much specificity, they should not be construed as limiting the scope of the invention. The above descriptions provide samples of some of the presently preferred embodiments. For example, the size of the present invention can be altered to allow it to be used in other applications. Modifications to the top housing eyepiece holder and the bottom housing barrel can be made to allow attachment of the present invention to eyepiece holders of microscopes and daytime spotting scopes.

Thus the scope of the invention should be determined by the appended claims and their legal equivalents, rather than by the examples given.

I claim:

1. A device for filtering images, comprising:
   a filter, the filter comprising a plurality of colors disposed contiguously on the filter and a plurality of color indicators, wherein each color indicator is disposed on a predefined color on the filter; and
   a housing having a top portion and a bottom portion, the top portion comprising an aperture and a top eyepiece holder and the bottom portion comprising a bottom housing barrel,
   wherein the top portion and bottom portion can be coupled together such that the top eyepiece holder and the bottom housing barrel align for viewing of the filter.

2. The filter of claim 1 wherein said filter is composed of a transparent disc with a diameter of between 25 mm and 150 mm, and a thickness of between 1 mm and 5 mm.

3. The filter of claim 1 wherein said filter is imprinted with indicators which identify their respective colors.

4. The housing of claim 1 wherein said housing sandwiches the enclosed filter.

5. The housing of claim 1 wherein said housing utilizes hollow, cylindrical barrels to sandwich said housing in between an eyepiece and eyepiece holder.

6. The hollow, cylindrical barrels of claim 5 wherein said barrels are aligned to allow a beam of light from an optical device to pass through them.

7. The housing of claim 1 wherein said housing contains a rotary device to turn the enclosed filter independently from said housing, providing a means of varying filter colors.

8. A device as claimed in claim 1, wherein the aperture is aligned to view the color indicator disposed on the filter during use.

9. A device as claimed in claim 8, wherein each color indicator identifies the color on which it is disposed.

10. A device as claimed in claim 1, wherein each color indicator comprises at least one letter identifying the predetermined color.

* * * * *